United States Patent [19]

Tarry et al.

[11] Patent Number: 4,770,887
[45] Date of Patent: Sep. 13, 1988

[54] TOMATO STEM AND PEEL DEVICE AND PROCESS

[75] Inventors: Jerry C. Tarry; Richard L. Wakeman, both of Modesto, Calif.

[73] Assignee: Tri/Valley Growers, San Francisco, Calif.

[21] Appl. No.: 56,468

[22] Filed: Jun. 1, 1987

[51] Int. Cl.⁴ .................. A23L 1/212; A23N 7/00
[52] U.S. Cl. ................................ 426/482; 99/585; 99/623
[58] Field of Search ............... 426/482, 483, 484; 99/585, 623, 628

[56] References Cited

U.S. PATENT DOCUMENTS

| | | | |
|---|---|---|---|
| 2,801,659 | 8/1957 | Carter | 99/585 |
| 4,444,096 | 4/1984 | Silvestrini et al. | 99/585 |
| 4,509,414 | 4/1985 | Chiu et al. | 99/585 |

Primary Examiner—George Yeung
Attorney, Agent, or Firm—Edward B. Gregg

[57] ABSTRACT

Apparatus for removing skins and stems from tomatoes and the like after they have been treated with lye or steam, including a bed of counter rotating rollers which pinch and remove the skins and stems, and one or more rotary elements above the bed which contact and roll the tomatoes so that the entire surface of each tomato is contacted uniformly with the rollers.

11 Claims, 4 Drawing Sheets

TOMATO STEM AND PEEL DEVICE AND PROCESS

FIELD OF THE INVENTION

This invention relates to equipment and a process for treating tomatoes. The equipment and process are also applicable to other fruits, e.g. grapes, cherries, peaches, pears, olives and prunes. The invention will be described particularly with reference to tomatoes.

BACKGROUND OF THE INVENTION

In the processing of tomatoes to produce peeled tomatoes and other tomato products, typically the tomatoes are treated with steam or lye and are then treated in what is called a peeler and stemmer. One such form of peeler and stemmer is illustrated in FIGS. 1 to 2 hereof and comprises a set of pinch rods which pinch the stems and skins remaining on the tomatoes and remove them from the tomato flesh. To accomplish this properly the surface of each tomato must be exposed sufficiently uniformly to the pinch rods so that skins and stems are completely removed.

However, the tomatoes often fail to roll sufficiently and as a consequence the entire surface of a tomato is not exposed to the pinch rods. That is to say the tomato tends to roll over the bed of pinch rods but without being rotated to expose each segment of surface to the pinching effect of the rollers.

OBJECTS OF THE INVENTION

It is an object of the invention to provide means whereby tomatoes processed as described above are exposed uniformly to the pinching effect of pinch rollers to uniformly remove the skins and stems.

It will be understood that the invention is applicable to other vegetables or fruit as described above.

GENERAL DESCRIPTION OF THE INVENTION

In accordance with the present invention tomatoes, as they pass along a bed of rollers as described above, are also caused to rotate in a generally circular manner, such motion being caused by frictional engagement of the tomatoes with overhead rotating friction members such as discs to the under surfaces of which are appended rubber fingers.

DETAILED DESCRIPTION OF THE INVENTION

Figure 1:
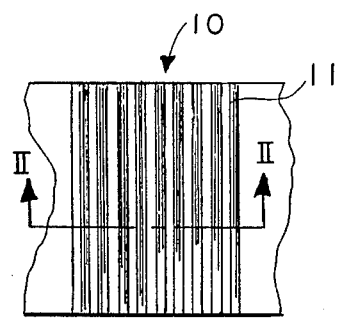
FIG. 1 is a diagrammatic plan view of a portion of the bed of rollers referred to above composed of rubber covered rollers.
Figure 2:
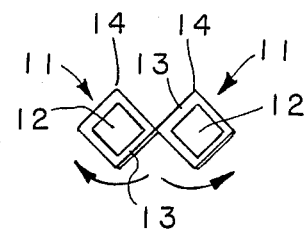
FIG. 2 is a vertical section through the bed at 2—2 showing the manner in which the skin and stems of a tomato are pinched and pulled from the tomato.

Referring now to FIG. 1, a fragment of a bed 10 of rollers 11 is shown. Two such rollers are shown in FIG. 2 each consisting of a rod 12 which is square in cross section and is covered by a square rubber covering 13 (which may be smooth or ribbed), presenting corners 14 which contact one another as the adjacent rollers rotate in opposite directions as indicated by the arrows. The rollers are suitably journalled in the frame of the machine and are provided with means to rotate adjacent rollers in opposite directions. Such mounting and rotating means are well known in the art.

Figure 4:
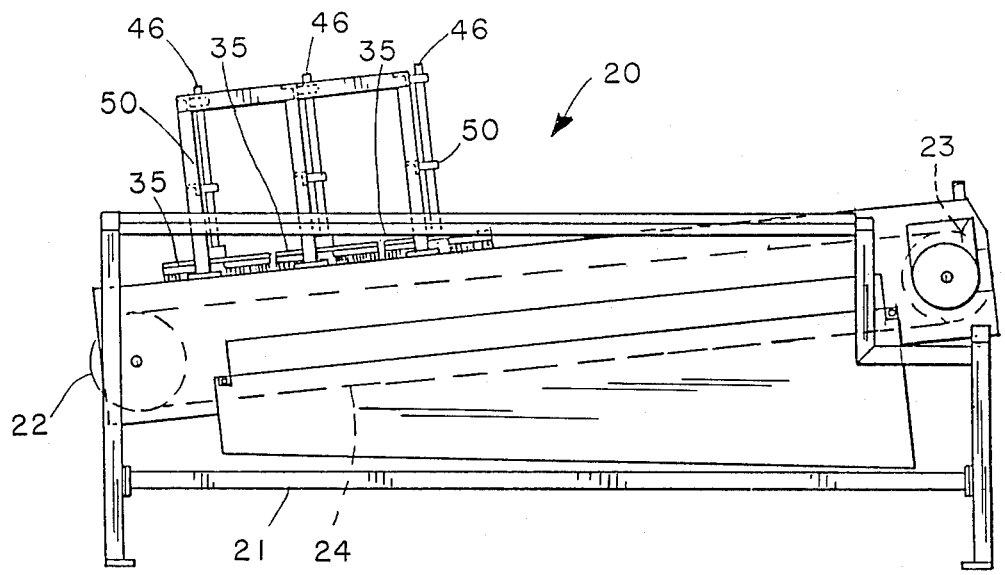
FIG. 4 is a side view of the apparatus as seen along the line IV—IV of FIG. 3.

Referring to FIG. 4, a tomato pinch roller unit of standard construction is shown at 20 which includes a frame 21, sprockets 22 and 23 suitably and rotatably mounted on the frame and chains 24 driven by the sprockets which rotate the rods 11, there being sprockets and chains on opposite sides of the peeler acting to rotate one set of rollers in one direction and the other set in the opposite direction. Other means may be used to counter rotate the rollers.

As will be seen the bed 10 slopes downwardly from the inlet end at the right to the outlet end at the left. The pinch roller unit is also provided with means (not shown) to oscillate the bed parallel to the path of travel of the tomatoes.

The pinch roller unit as thus far described is conventional. Such units may differ from that described above but all have in common a bed of rollers in which adjacent rollers rotate oppositely to pinch the remaining skins and stems of tomatoes and to remove the skins and stems.

Figure 7:
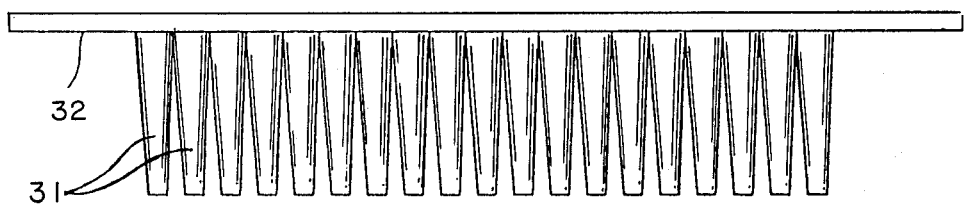
FIG. 7 is a view in side elevation of the same segment of matting.
Figure 6:
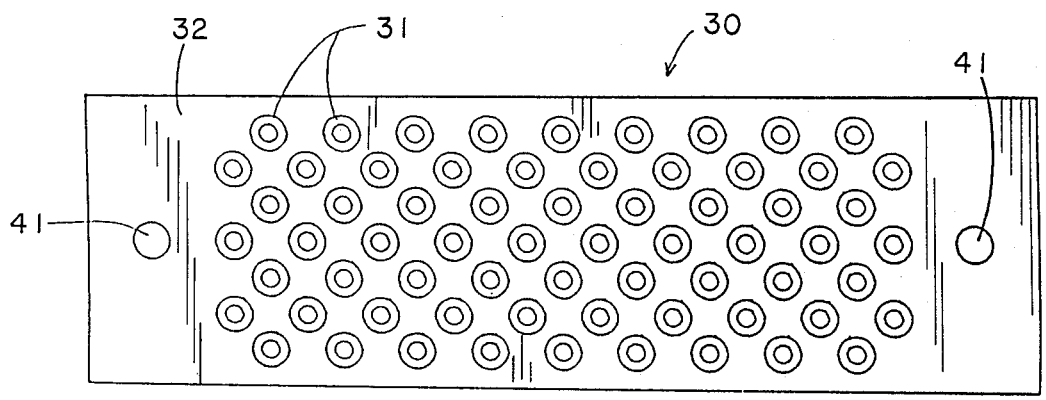
FIG. 6 is a plan view of a segment of rubber matting employed to form the friction elements of the invention.

Referring now to FIG. 6 and 7, commercially available matting material is shown at 30 which is preferably of a type known as SKRUB-KLEEN MATTING sold by Holz Rubber Company of Lodi, California for use in washing and peeling fruits and vegetables. Preferably type XLM-24-PB SKRUB-KLEEN matting is used having fingers or nubs 31 of frusto-conical shape as shown which are integral with the base 32 and are about 1¼ inch high, other dimensions of the matting (thickness, diameters) being in proportion, there being eight fingers per square inch.

The material of the matting is natural rubber of dorometer 55 but other material, e.g. synthetic plastic material, having similar flexibility, surface characteristics, lack of toxicity and wear quality may be used.

Figure 8:
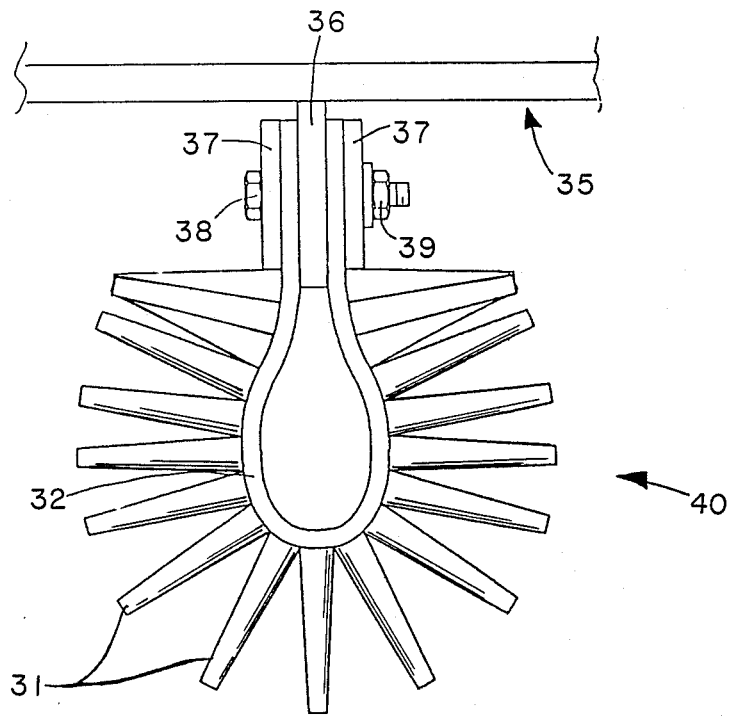
FIG. 8 is a side view of one of the friction elements fashioned from the matting of FIGS. 6 and 7 showing how it is formed and secured to a rotating disc.

A portion of a mounting and rotating disc 35 is shown in FIG. 8 equipped with mounting means including a bracket 36, plates 37, a bolt 38 and a nut 39. The matting cut to suitable size, is formed into friction elements 40 by bending as shown, bolt holes 41 being provided as shown in FIG. 6. The ends are clamped between plates 37 and bracket 36, one or more bolts 38 and nuts 39 being used to hold the element in place.

Figure 9:
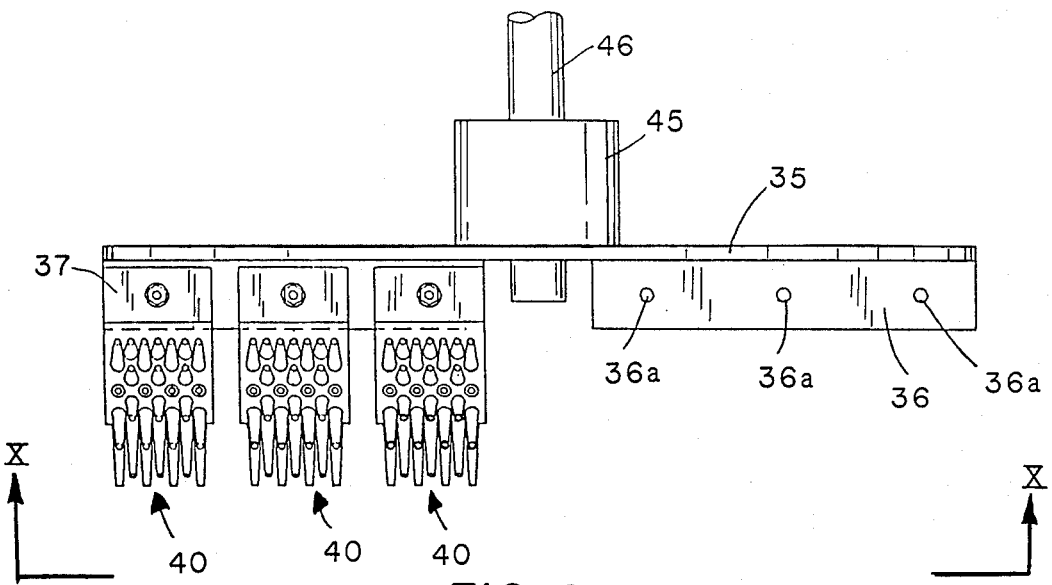
FIG. 9 is a view in elevation of one such disc with some of the friction elements attached.
Figure 10:
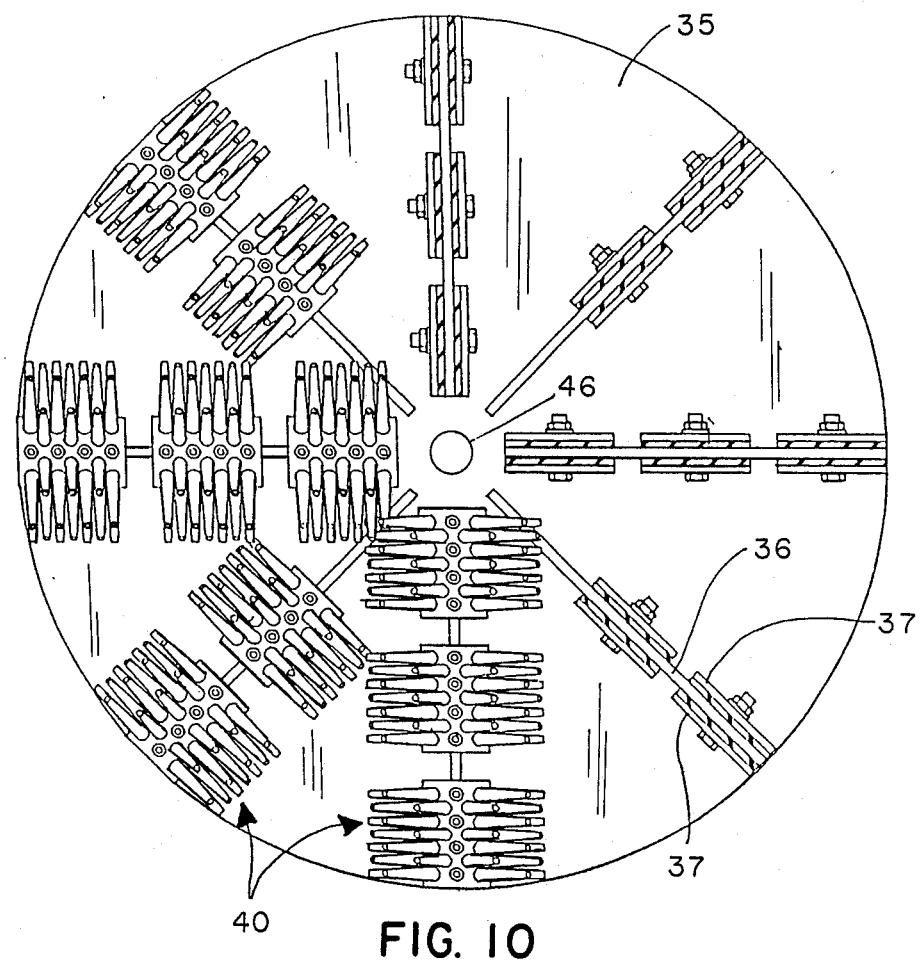
FIG. 10 is a view along the line X—X of FIG. 9.

Referring to FIGS. 9 and 10, a suitable pattern of rotating elements 40 is shown in FIG. 10 (bolt holes 36a being shown in FIG. 9) although for simplicity and clarity some of the elements are not shown in FIG. 9 and some in FIG. 10 are shown in section. The disc 35 is shown having a tub 45 attached to and adjustable lengthwise of a shaft 46. The disc 35, and therefore the rotating elements 40, can be adjusted in relation to the plane of the bed 10. Normally tomatoes of a given diameter will be processed so that simple adjustment of discs 35 on shafts 46 will suffice to cause the elements 40 to be at the proper level to cause at least the tips of the fingers 31 to contact the tomatoes sufficiently firmly to rotate the tomatoes as the disc 35 rotates.

The pattern of elements 40 shown in FIG. 10 has been found to be suitable but other patterns may be employed, the object being to cause adequate contact with and to impart adequate rotary motion to the tomatoes so as to contact the entire tomato surface uniformly with the rollers 11. This rotation serves to bring each segment of surface into contact with the rollers 11.

Figure 3:
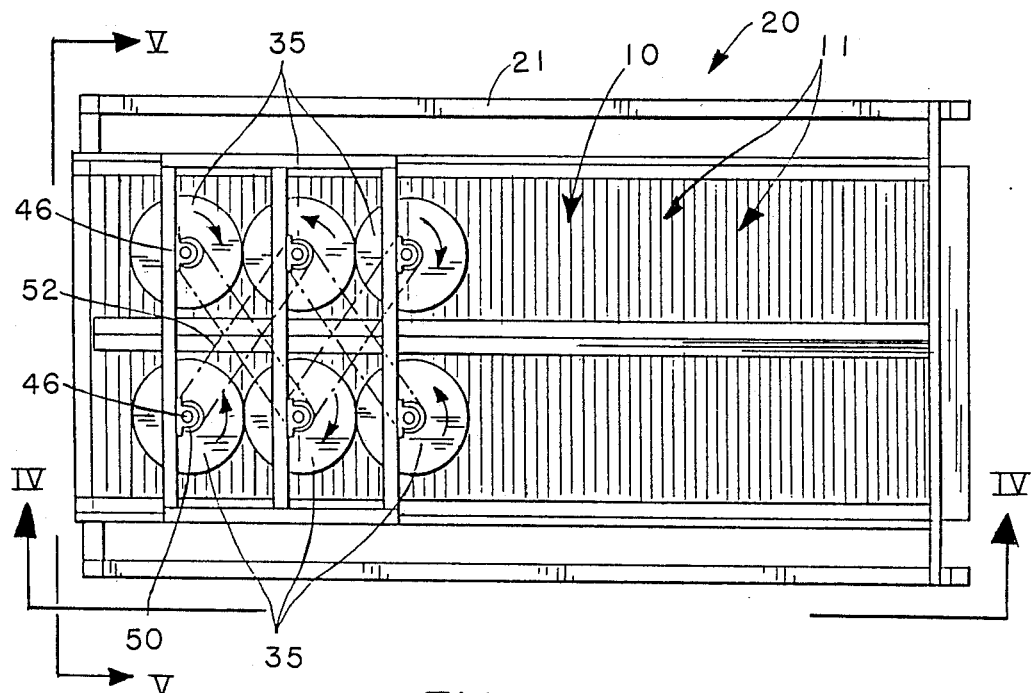
FIG. 3 is a top plan view of a tomato peeler and stemmer incorporating the features of the invention.
Figure 5:
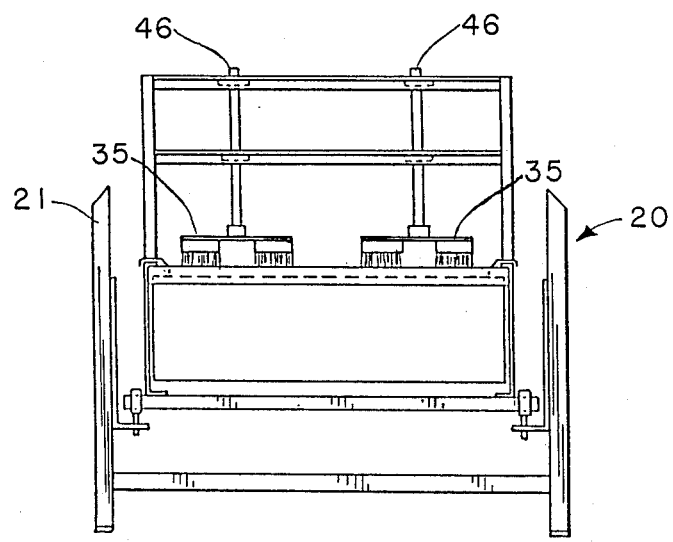
FIG. 5 is an end view as seen along the line V—V of FIG. 3.

Referring again to FIGS. 3, 4 and 5, six discs 35 are shown in FIG. 3 arranged in two rows, the discs of each row being adjacent one another. Fewer or more discs may be employed and the pattern may be varied although the pattern shown has proved to be advantageous. The shafts 46 are rotatably mounted, as by collars or bearings 50. Each disc in a given row is rotated oppositely to the adjacent disc or discs as indicated by the arrows in FIG. 3, such being accomplished by any suitable means such as belts or chains 52 driven by suitable gears or pulleys (not shown).

In operation the pinch roller unit 20 will function in the usual fashion, as described above. That is, the tomatoes will descend by gravity, the pinch rollers 11 will rotate with adjacent rollers rotating oppositely and the bed may oscillate parallel to the direction of movement of the tomatoes. The speed of rotation of the rollers will be varied to suit given conditions. The discs 35 and with them the friction elements 40 will meanwhile rotate in the manner described above and will cause each tomato to rotate in the slanting plane of the bed 10 so that the entire surface of each tomato will be brought uniformely into contact with the rollers 11 thereby exposing the entire surface to the pinching action of the rollers. By this means the skins and stems are removed uniformly. The tomatoes will also be contacted by the upper portions of the friction elements 40 which will assist in the desired action.

It will therefore be apparent that new and useful apparatus and method are provided of removing skins and stems from tomatoes and other vegetables and fruits.

We claim:

1. A method of removing the skins or the skins and stems of fruits or vegetables which comprises:
    (a) causing the fruits or vegetables to move along a bed of parallel, horizontal rollers located in side-by-side relation
    (b) causing adjacent rollers to rotate oppositely, thereby pinching the skins or the skins and stems of the fruits or vegetables and removing the same and
    (c) during such movement and pinching action rotating the fruits or vegetables to cause the entire surface of each to contact the rollers, thereby causing uniform skin or skin and stem removal.

2. The method of claim 1 wherein step (c) is accomplished by rotation of contact members above and in contact with the fruits or vegetables.

3. The method of claim 2 wherein the contact members are in the form of downwardly extending flexible fingers.

4. The method of claim 3 wherein there is at least one cluster consisting of two or more sets of fingers, the sets being adjacent one another and rotating oppositely to one another.

5. Skin or skin and stem removal apparatus comprising:
    (a) a bed formed by rollers parallel and adjacent to one another and provided with means to rotate adjacent pairs of rollers oppositely, such rollers serving to pinch the skins or skins and stems of fruits or vegetables as they pass along the bed and
    (b) rotating means located above the bed at a height to permit fruits or vegetables to pass along the bed but to contact at least the upper surfaces thereof and to rotate them while so passing in such manner as to expose the entire surface of each to contact with the rollers and thereby to expose the skins or skins and stems to uniform pinching action of the rollers.

6. The apparatus of claim 5 wherein such rotating means is in the form of contact members above and in contact with the fruits or vegetables.

7. The apparatus of claim 6 in which the contact members are in the from of downwardly extending flexible fingers.

8. The apparatus of claim 7 in which there is at least one cluster consisting of two or more sets of fingers, the sets being adjacent one another and rotating oppositely to one another.

9. In an apparatus for peeling and stemming tomatoes comprising a bed of rubber covered rollers along which tomatoes pass while their skins and stems are pinched and pulled form the flesh of the tomatoes by the rollers, the improvement which comprises:
    a plurality of discs mounted above and parallel to the plane of the rollers, at least some of such discs being adjacent one another,
    means causing the discs to rotate parallel to the rollers with adjacent discs rotating oppositely and
    a plurality of rubber fingers mounted on the under surface of each disc to contact, rub and rotate tomatoes passing under said bed.

10. Tomato peeling and stemming apparatus comprising:
    (a) a bed of pinch rollers arranged horizontally and adjacent to one another
    (b) means causing the rollers to rotate with adjacent rollers rotating oppositely to one another and
    (c) means causing tomatoes, as they pass along the bed (a) to rotate so as to expose the surface of each tomato uniformly to the pinching action of the rollers,
        (1) said means (c) being in the form of a plurality of sets of flexible fingers located above the tomatoes on said bed (a) and which contact the surfaces of the tomatoes, and
        (2) means causing the tips of the fingers to rotate in a plane or planes parallel to the bed (b).

11. The apparatus of claim 10 wherein each set of flexible fingers is formed by a strip of rubber having flexible rubber fingers projecting from one face of the strip, said strip being folded upon itself to form a loop with the fingers projecting from the outer face of the loop.

* * * * *